Jan. 2, 1951     G. F. HODSON ET AL     2,536,057
EGG CONVEYER
Filed July 11, 1945     2 Sheets-Sheet 1
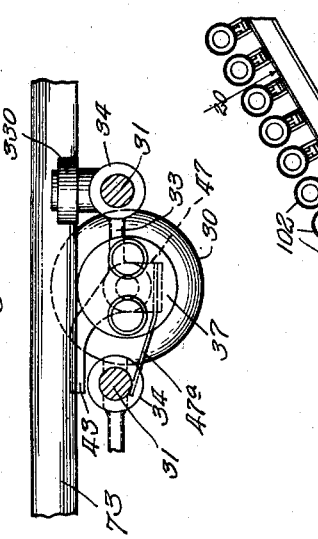
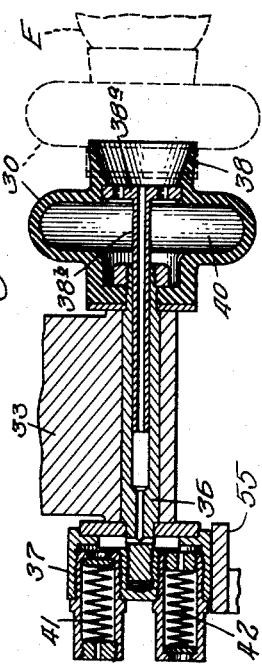
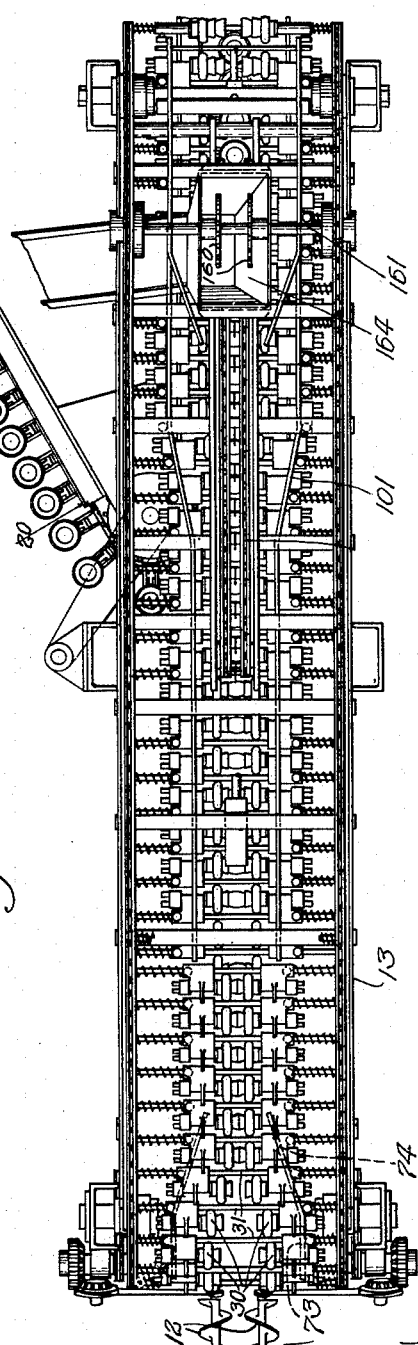
Inventors
George F. Hodson,
Lyman L. Campbell,
By Chritton, Wiles, Schroeder, Merriam & Hofgren, Attys.

Jan. 2, 1951 G. F. HODSON ET AL 2,536,057
EGG CONVEYER
Filed July 11, 1945 2 Sheets-Sheet 2
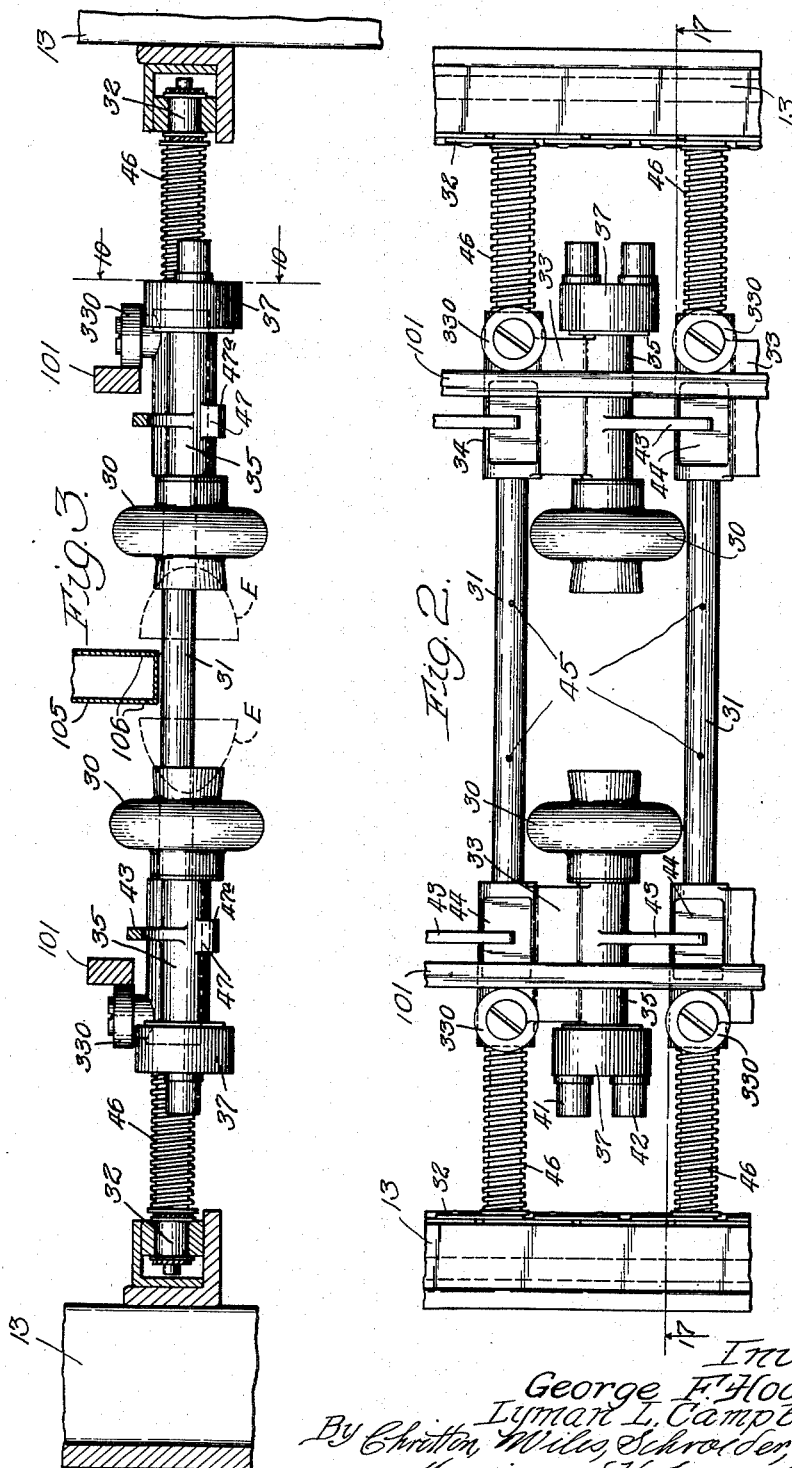
Inventors
George F. Hodson,
Lyman L. Campbell,
By Chritton, Wiles, Schroder,
Merriam & Hofgren, Attys.

Patented Jan. 2, 1951

2,536,057

UNITED STATES PATENT OFFICE 2,536,057

EGG CONVEYER

George F. Hodson, Altus, Okla., and Lyman L. Campbell, Riverdale, Ill., assignors to Wilson & Company, Inc., a corporation of Delaware Application July 11, 1945, Serial No. 604,326

14 Claims. (Cl. 198—131)

The present invention relates to vacuum cups, and more particularly to vacuum cups adapted to grasp eggs in an egg breaking machine.

The invention is usable in an egg breaking machine such as that shown in the copending George F. Hodson application, Serial No. 534,552, filed May 8, 1944, and issued as Patent No. 2,443,188 June 15, 1948.

An object of the invention is to provide means for grasping and securely holding eggs without breaking them.

Another object is to provide a vacuum cup assembly of two cups which will hold an egg therebetween while the egg is being treated in the machine, and in which each of the cups will retain the shell therein after the contents are emptied, and until the vacuum is broken.

Further objects and advantages will be apparent from the following specification and the drawings in which:

Fig. 1 is a plan view of part of the machine with which the device is used.

Fig. 2 is a detailed plan view partly in section of one embodiment of the invention.

Fig. 3 is a transverse elevation partly in section, taken along the line 17—17 of Fig. 2.

Fig. 4 is an enlarged sectional view through the vacuum cup mechanism.

Fig. 5 is a sectional view taken along the line 10—10 of Fig. 3.

In the embodiment of the invention shown in the drawings, the eggs are introduced into the machine by a dual screw feed between which the eggs are advanced between two screws 12, each of which has a variable pitch so that the eggs are accelerated in motion as they advance. The eggs "E" are aligned with their long axes transverse to the direction of movement and only the ends of the egg are engaged by the screw threads.

At the top of the screw feed the eggs are passed individually to a mechanical device, such as the saddle described in the above mentioned copending application Serial No. 534,552, and in the copending application of George F. Hodson and Lyman L. Campbell, Serial No. 560,263, filed October 25, 1944, now Patent No. 2,403,980 granted July 16, 1946, from which they are transferred to flexible suction cups 30, one of which grasps each end of the egg. These cups are carried on platforms 33 pivotally mounted in pairs on shafts 31 mounted between a pair of chains 32, one at each end of the shaft and which are suitably mounted on the frame 13 of the machine. The platform is enlarged at one side to form a sleeve 34 which fits loosely about the shaft 31, and at the other end to form a sleeve 35 which forms a bearing surface for the hollow shaft 36. The shaft 36 carries the vacuum cup 30 at its inner end and the roller 37 at its outer end. In order to add to the life and resilience of the cup, it is desirable to incorporate a spirally wound telescoping spring (not shown) in the vacuum cups.

The suction cup is made of some flexible material such as rubber. It comprises an egg engaging portion 38 having suitably beveled inner walls which terminate in a feather edge. A perforated metal plate 38a carried by the perforated hollow guide rod 38b separates the egg engaging portion from the suction chamber 40. The rod 38b extends into the shaft 36. The suction chamber communicates through the hollow shaft with a check valve 41 carried in one arm of the roller 37, and with a vacuum relief valve 42 in the other arm of the roller 37. The valve 41 serves to vent any pressure which may accumulate in the suction chamber, and the valve 42 may be set to open upon any given vacuum, in order to limit the vacuum which may be created within the suction chamber.

The platform 33 also carries a stop 43 which bears upon the slide area 44 of the next adjacent platform and serves to limit the downward movement of the cup 30. The shaft 31 is provided with a suitable pin 45 for limiting the inward movement of the platform 33. A spring 46 is provided in connection with each platform and normally urges the platform toward the center of the shaft under a suitable pressure which is not sufficient to crush the eggs. Normally this pressure will be in the neighborhood of 4 pounds.

The platform 33 also carries a depending shoulder portion 47 to which is secured the leaf spring 47a which normally urges the platform in a downward direction. The platform 33 also carries the cam roller 330 which functions to position the platform laterally, as will be later described.

The chains 32 which carry the vacuum cups 30 are driven by wheels mounted on shafts 71 and 71a. At the appropriate time during the course of travel the cam roller 330 engages the cam surfaces 73 and as a result is forced back against the springs 46 until there is more than sufficient space between the cups to receive the egg "E." Then the rollers 330 engage the cam surfaces 74 which are inclined toward each other, as shown in Fig. 1, and the tension on the cam roller 330 is gradually lessened, whereby the cups are advanced inwardly until each cup contacts an end of the egg. At the same time the rollers 37 contact a member 55 which causes the cup assembly to rotate to securely seat the egg, which is held against rotation by any suitable means (such as shown and described in our said copending application Serial No. 534,552), in the portion 38 of the cup. Then the rollers 330 reach the end of the cam surfaces 74 and all pressure against the rollers is released. The springs 46 force the cups 30 toward each other and against the eggs 30 to drive the air out of the cups 30 and to create sufficient vacuum therein to hold the end of the egg in the cup even after the egg has been cut in half and the contents thereof permitted to drop therefrom. In practice a cam 101 contacts the rollers 330 to separate the severed eggs sufficiently to permit the contents thereof to drop into a container such as cups 102 which may be mounted in the frame 13 on a chain below the chain 32.

While one embodiment of the invention has been shown and described, it is to be understood that it is capable of many modifications and changes without departing from the spirit and scope of the invention as disclosed in the appended claims.

We claim:

1. A vacuum cup for holding eggs in an egg breaking machine comprising: a vacuum chamber of flexible material; an engaging portion connected to said chamber; a hollow pipe extending through the chamber and having an enlarged perforated end between the chamber and said portion; and a valve for said pipe.

2. A vacuum cup for holding eggs in an egg breaking machine comprising: a vacuum chamber of flexible material having a perforated wall; an egg engaging portion extending from said chamber around said wall; a hollow pipe extending through said chamber and terminating in said portion; and a vacuum limiting valve on the other end of said pipe.

3. A vacuum cup for holding eggs in an egg breaking machine comprising: a vacuum chamber of flexible material having a perforated wall; an egg engaging portion extending from said chamber around said wall; a hollow pipe extending through said chamber and terminating in said portion; a valve on the other end of said pipe to vent pressure from said chamber; and means for limiting the vacuum which may be created in said chamber.

4. A vacuum cup assembly for holding eggs in an egg breaking machine comprising: a shaft movably mounted on the machine; a pair of platforms mounted on the shaft, each platform having a vacuum cup with oppositely facing egg engaging portions mounted thereon; an air escape means having a check valve and communicating with said cup; and means for moving said platforms toward and away from each other.

5. A vacuum cup assembly for holding eggs in an egg breaking machine comprising: a shaft movably mounted on the machine; a pair of platforms mounted on said shaft; a pair of hollow shafts each journaled in one of said platforms each of said hollow shafts being provided with pressure responsive means; a vacuum cup on the inner end of each hollow shaft; and means for moving said platforms toward and away from each other.

6. A vacuum cup assembly for holding eggs in an egg breaking machine comprising: a shaft mounted on the machine; a pair of platforms pivotally mounted on said shaft; a hollow shaft rotatably mounted in each platform, said hollow shaft being provided with venting and pressure limiting valve means; a vacuum cup bearing an egg receiving portion on the inner end of each shaft, said vacuum cup being adapted to maintain a vacuum created therein.

7. A vacuum cup assembly for holding eggs in an egg breaking machine comprising: a shaft mounted on the machine; a pair of platforms pivotally mounted on said shaft; a hollow shaft rotatably mounted in each platform; a vacuum cup bearing an egg receiving portion on the inner end of each shaft; means for moving said platforms longitudinally on said first shaft, said vacuum cup being adapted to maintain a vacuum created therein by said longitudinal movement of said platform while an egg is positioned in said egg receiving end.

8. A vacuum cup assembly for holding eggs in an egg breaking machine comprising: a shaft mounted on the machine; a pair of platforms pivotally mounted on said shaft; a hollow shaft rotatably mounted in each platform; a vacuum cup bearing an egg receiving portion on the inner end of each hollow shaft, said vacuum cup being adapted to maintain a vacuum created therein; and rotating means on the outer end of said hollow shafts adapted to rotate said cup to seat securely an egg therein.

9. The device claimed in claim 8, wherein each rotating means carries a valve communicating through said shaft with the cup.

10. The device claimed in claim 8, wherein each rotating means carries means for limiting the vacuum which may be created in the cup.

11. In an egg breaking machine a plurality of the devices claimed in claim 8 mounted on endless chains.

12. In an egg breaking machine, a frame on which a pair of endless chains are mounted; a plurality of shafts carried by said chains; a pair of vacuum cups on each shaft and having oppositely facing egg engaging portions; and means for moving said cups longitudinally on said shafts to engage opposite portions of an egg whereby a holding vacuum is created in said cups.

13. The device claimed in claim 8, wherein each platform is provided with a cam and the machine is provided with cam surfaces adapted to engage said cams to move said platforms longitudinally on the shafts on which they are mounted.

14. The device claimed in claim 4, wherein the means for moving the platforms comprises springs on the shaft, a cam on each platform and cam surfaces on the machine.

GEORGE F. HODSON.
LYMAN L. CAMPBELL.

REFERENCES CITED

The following references are of record in the file of this patent:

UNITED STATES PATENTS

| Number | Name | Date |
|---|---|---|
| 1,222,535 | Crum | Apr. 10, 1917 |
| 1,311,776 | Rodriquez | July 29, 1919 |
| 1,407,524 | Fourchy | Feb. 21, 1922 |
| 2,177,967 | Watkins | Oct. 31, 1939 |